May 8, 1951   F. ERNST   2,551,878
PISTON RING
Filed Nov. 24, 1945
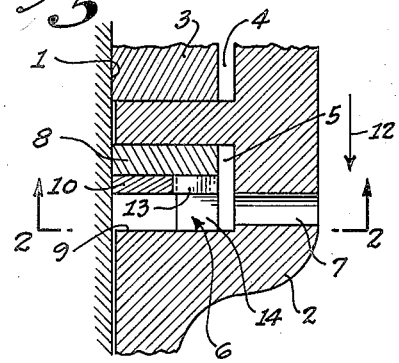
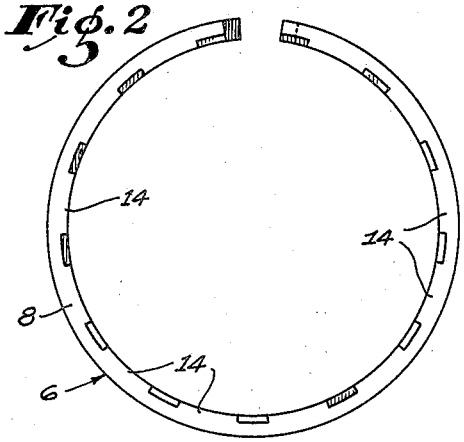
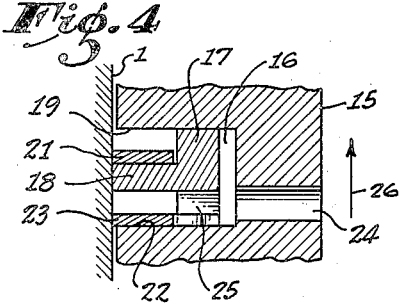
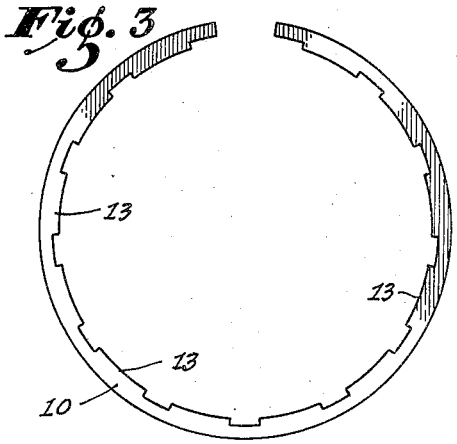
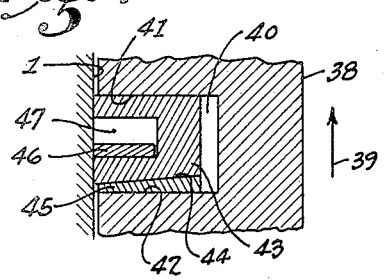
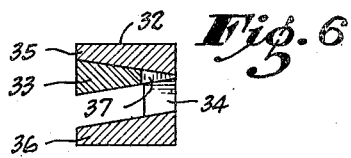
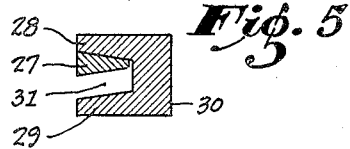
INVENTOR.
Fred Ernst
BY John Flam
ATTORNEY Patented May 8, 1951

2,551,878

UNITED STATES PATENT OFFICE 2,551,878

PISTON RING

Fred Ernst, Gardena, Calif., assignor to
Guy H. Hall, Los Angeles, Calif.

Application November 24, 1945, Serial No. 630,629

4 Claims. (Cl. 309—45)

This invention relates to piston rings, especially for use in internal combustion engines.

A piston ring suitable for such purposes is described and claimed in a prior application filed in the name of Fred Ernst on October 28, 1938, under Serial No. 237,502, and entitled "Piston Ring," now Patent No. 2,400,109, issued May 14, 1946. The present application is a continuation in part of the said prior application.

In this prior application, there is described an auxiliary ring employed with an oil ring for reducing carbon deposits in the oil passages or on the ring, and for facilitating the passage of oil from the cylinder to the interior of the piston. This result is accomplished by placing the auxiliary ring in a space defined by the oil ring. The auxiliary ring has substantial clearance in an axial direction with respect to the space in which the auxiliary ring is provided. Since the auxiliary ring contacts the cylinder walls in a resilient manner, the reciprocation of the piston causes relative motion between the auxiliary ring and the main ring. This results in a pounding and scraping action that maintains the passages and surfaces free of deposits.

It is one of the objects of this invention to improve and simplify the structure disclosed in said prior application.

Although the invention has particular utility with respect to oil rings, it is not necessarily limited thereto, since the novel ring may be effectively utilized for compression rings.

This invention possesses many other advantages, and has other objects which may be made more clearly apparent from a consideration of several embodiments of the invention. For this purpose there are shown a few forms in the drawings accompanying and forming part of the present specification. These forms will now be described in detail, illustrating the general principles of the invention; but is to be understood that this detailed description is not to be taken in a limiting sense, since the scope of the invention is best defined by the appended claims.

Referring to the drawing:

Fig. 1 is a fragmentary, sectional view illustrating a ring structure incorporating the invention;

Fig. 2 is a sectional view, taken along plane 2—2 of Fig. 1;

Fig. 3 is a plan view of a supplemental ring utilized in the ring structure of Fig. 1;

Fig. 4 is a sectional view, similar to Fig. 1, but illustrating a modified form of the invention; and Figs. 5, 6, and 7 are sectional views of a ring structure illustrating further modifications.

A fragmentary portion of a cylinder wall 1 and a corresponding piston 2 are illustrated in Fig. 1. Contacting the cylinder wall 1 is an expanding ring 3 disposed in a groove 4 in the periphery of the piston 2. This ring may be of the usual compression type, having ends that permit it to expand into contact with the wall 1. Below groove 4, there is another groove 5. In this groove 5, a piston ring structure is shown including a main piston ring 6. This main piston ring is preferably formed of cast iron and split in order to permit expansion into contact with the wall 1. The groove 5 communicates with an oil passage 7 leading to the interior of the piston 2.

The ring 6 has an overhanging flange 8. This flange, with the lower wall 9 of recess 5, forms an annular space in which is located a supplemental ring 10. This supplemental ring 10 is of substantially less width than the annular space between the flange 8 and the surface 9.

Accordingly, when the piston 2 moves downwardly, as indicated by the arrow 12, the supplemental ring 10, being in frictional contact with the wall 1, is urged against the lower side of flange 8, and held in this position during the downward stroke of the piston. Upward movement of the piston causes the supplemental ring 10 to move into contact with the wall 9, and to be retained in contact therewith for the full upward stroke of the piston.

This relative motion between the supplemental ring 10 and the main ring structure 6 serves to prevent carbon accretion. Such a supplemental ring may be utilized for oil rings, as well as for compression rings.

In the form illustrated in Fig. 1, the ring 10 may be made of steel and expanded into contact with the wall 1 by its resilience. It is also provided with a number of inwardly directed projections 13, shown most clearly in Fig. 3, that extend into corresponding slots 14 in the main ring 6. These oil passages are kept free of carbon by the pounding action as the ring 10 and its projections 13 move with respect to the main ring 6. The auxiliary or supplemental ring 10 assists in urging the oil (removed by scraping of the wall 1) through these oil passages during relative motion between the ring parts.

In the form shown in Fig. 4, the piston 15 is provided with a piston ring recess 16. The main cast iron ring 17 in this instance is provided with an intermediate flange 18. This flange forms, with the upper wall 19 of recess 16, an annular space in which an auxiliary or supplemental ring 21 is disposed. The auxiliary ring in this upper recess is a split ring of the type shown in Fig. 3, but without the projections 13. That portion of the ring including the flange 18 and the supplemental ring 21 operates as a compression ring.

The flange 18 forms a recess with the lower wall 22 of recess 16. In this lower recess a supplemental ring 23 is provided of substantially the same form as ring 10. There being oil apertures 24 in the piston 15, and passages or slots 25 in the ring 17, this portion of the ring including the supplemental ring 23 operates as an oil ring.

The piston 15 in moving upward, as indicated by arrow 26, causes the auxiliary rings 21 and 23 to be urged against the lower walls of their respective recesses. Here, again, the substantial space provided for axial movement of rings 21 and 23 ensures against material carbon accretion.

In the forms of the invention thus far described, the supplemental rings, such as 10, 21, and 23, are made from flat steel stock. However, in the form illustrated in Fig. 5, the supplemental ring 27 is shown as of wedge cross-section. The flanges 28 and 29 of the main piston ring 30 are correspondingly sloping. These flanges 28 and 29 are spaced sufficiently to permit substantial relative movement between the supplemental ring 27 and the main ring 30. The taper of the recess 31 in which the ring 27 moves is such that it diverges toward the periphery of the ring 30.

The form illustrated in Fig. 5 is a compression ring. In Fig. 6 a similar ring is shown adapted to operate as an oil ring. Here, the main ring 32 and the auxiliary ring 33 are of substantially the same form as that illustrated in Fig. 5. However, oil passages 34 are formed between the flanges 35 and 36 of the main ring 32. Ring 33 is provided with a number of inwardly directed projections 37 that extend into the passages 34.

In another form of ring, illustrated in Fig. 7, the piston 38 is shown as moving upwardly as indicated by arrow 39. The piston ring recess 40 has parallel upper and lower walls 41 and 42. The main ring 43 has a lower sloping surface 44. The slope of wall 44 is such that the thickness of the ring 43 increases as the periphery of the piston 38 is approached. Spacer ring 45 is interposed between the surfaces 42 and 44 and is so shaped as to be in contact with both of these surfaces.

In this way, it is assured that there will be an outward force urging ring 43 against the cylinder 1 in spite of wear.

A supplemental ring 46 is located in the recess 47 formed in the ring 43. It operates in the same manner as the supplemental ring 21 of Fig. 4.

The inventor claims:

1. In a piston ring structure: a ring having a body portion and a flange extending from the body portion and adapted to define an annular recess with a wall of the ring groove in the piston; and a supplemental ring in said recess and having substantially less width than the recess.

2. In a piston ring structure: a ring having a body portion and a flange extending from the body portion and adapted to define an annular recess with a wall of the ring groove in the piston; said body portion having oil apertures; and a supplemental ring in said recess and substantially less in width than the recess, said supplemental ring having projections extending into the apertures.

3. In a piston ring structure: a ring having a body portion and a flange extending from the body portion to define a pair of annular recesses with opposite walls of the ring groove in the piston; and supplemental rings respectively in the recesses and substantially less in width than the corresponding recess.

4. In a piston ring structure: a ring having a body portion and a flange extending from the body portion to define a pair of annular recesses with opposite walls of the ring groove in the piston, said body portion having oil apertures; and supplemental rings respectively in the recesses and substantially less in width than the corresponding recesses, one of said rings having projections extending into said oil apertures.

FRED ERNST.

REFERENCES CITED

The following references are of record in the file of this patent:

UNITED STATES PATENTS

| Number | Name | Date |
| --- | --- | --- |
| 1,111,062 | Girtanner | Sept. 22, 1914 |
| 1,342,380 | Hachmann | June 1, 1920 |
| 1,418,918 | Hall | June 6, 1922 |
| 2,034,770 | Porter | Mar. 24, 1936 |
| 2,148,997 | Phillips | Feb. 28, 1939 |
| 2,252,199 | Phillips | Aug. 12, 1941 |
| 2,273,703 | Gille | Feb. 17, 1942 |
| 2,329,296 | Rentfro | Sept. 14, 1943 |
| 2,329,950 | Smith | Sept. 21, 1943 |
| 2,349,903 | Fall | May 30, 1944 |
| 2,362,673 | Smith | Nov. 14, 1944 |
| 2,391,134 | Conrad | Dec. 18, 1945 |
| 2,400,109 | Ernst | May 14, 1946 |